Nov. 7, 1961 T. A. SEEGRIST 3,007,433
OUTBOARD MOTOR STARTER

Filed March 7, 1961 9 Sheets-Sheet 1

*Thorne A. Seegrist*
INVENTOR

Theodore A. Seegrist
INVENTOR

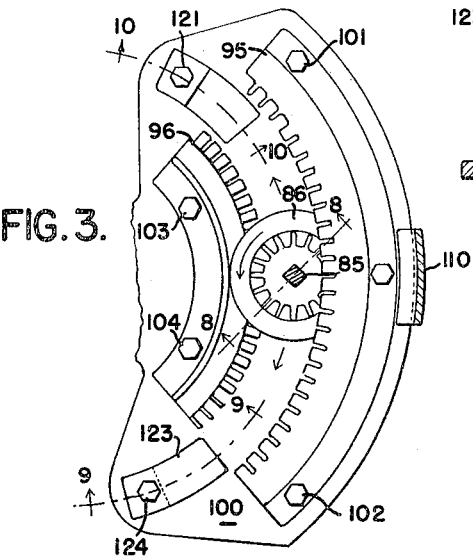
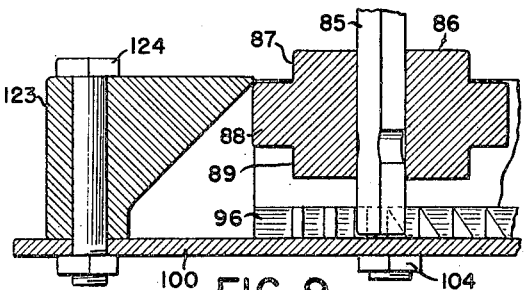
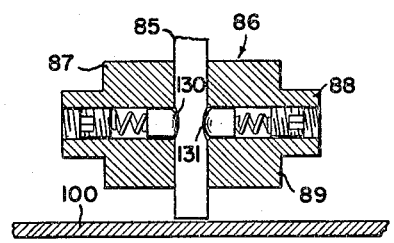
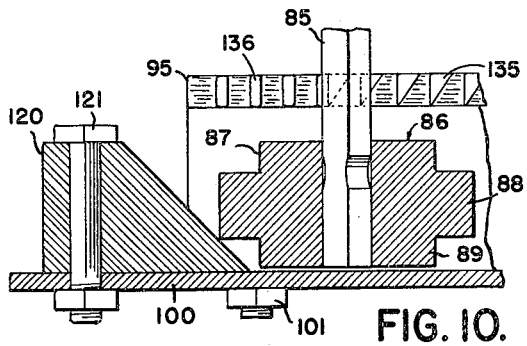
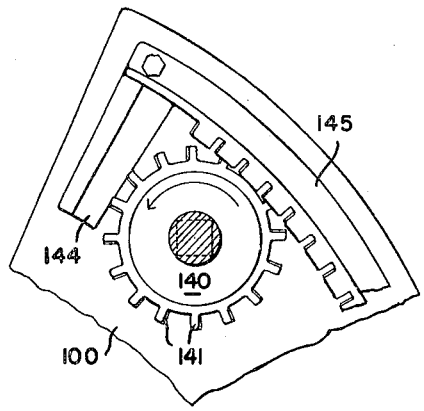
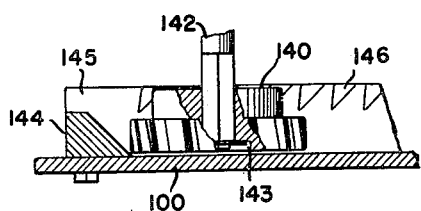

Nov. 7, 1961 T. A. SEEGRIST 3,007,433
OUTBOARD MOTOR STARTER
Filed March 7, 1961 9 Sheets-Sheet 5
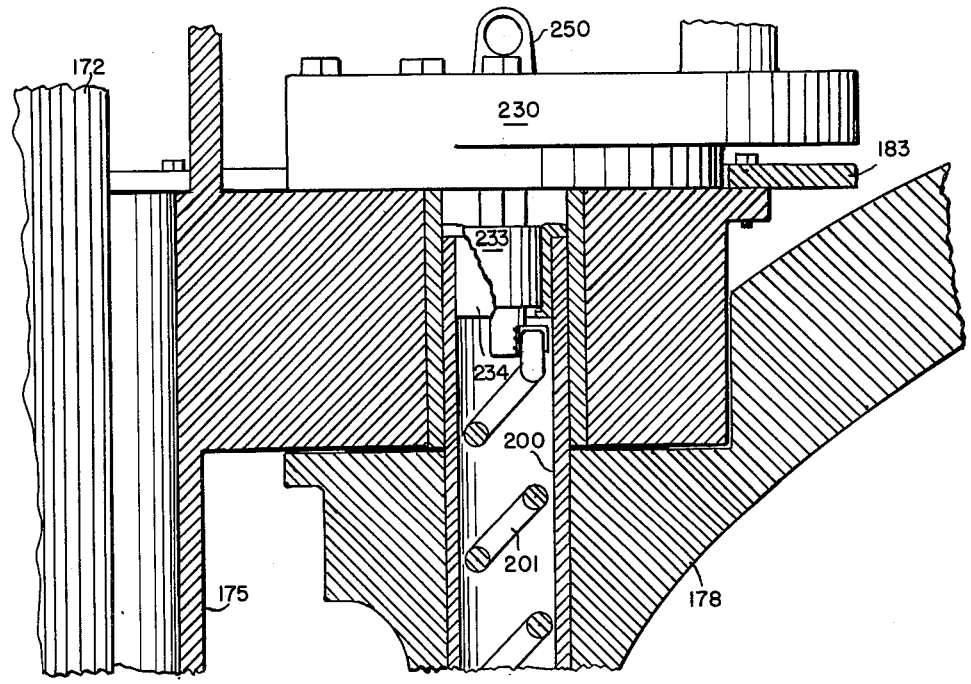
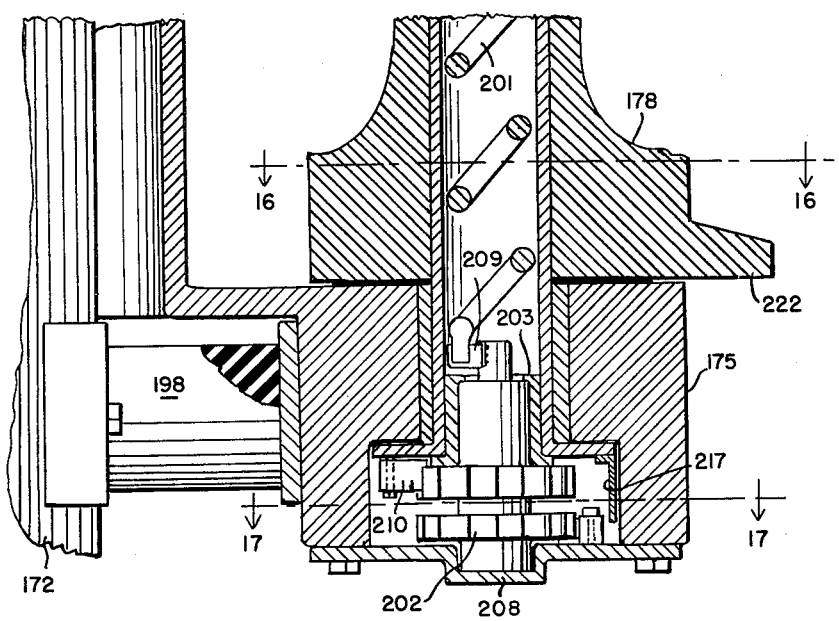
FIG. 14.
*Theodore A. Seegrist*
INVENTOR

INVENTOR

United States Patent Office 3,007,433
Patented Nov. 7, 1961

3,007,433
OUTBOARD MOTOR STARTER
Theodore A. Seegrist, Box 223, McLean, Va.
Filed Mar. 7, 1961, Ser. No. 94,037
15 Claims. (Cl. 115—18)

This invention to a starter for an outboard motor provided with an internal combustion engine and has among its objects the provision of a simple mechanical starter which may be manually operated by the helmsman from a convenient position.

In general, according to the invention a spring motor is provided, the stored energy of which can be easily released to crank the engine and which is wound by a simple operation of the steering mechanism of the outboard motor. Thus the helmsman winds the spring motor from the steering position by manipulating the steering handle, whether the steering and control handle of the outboard motor itself, or a steering wheel on the dashboard of a boat equipped with remote controls, and releases the spring motor as, for example, by pulling on a flexible strand threaded from the starter to a dashboard position.

Figure 1:
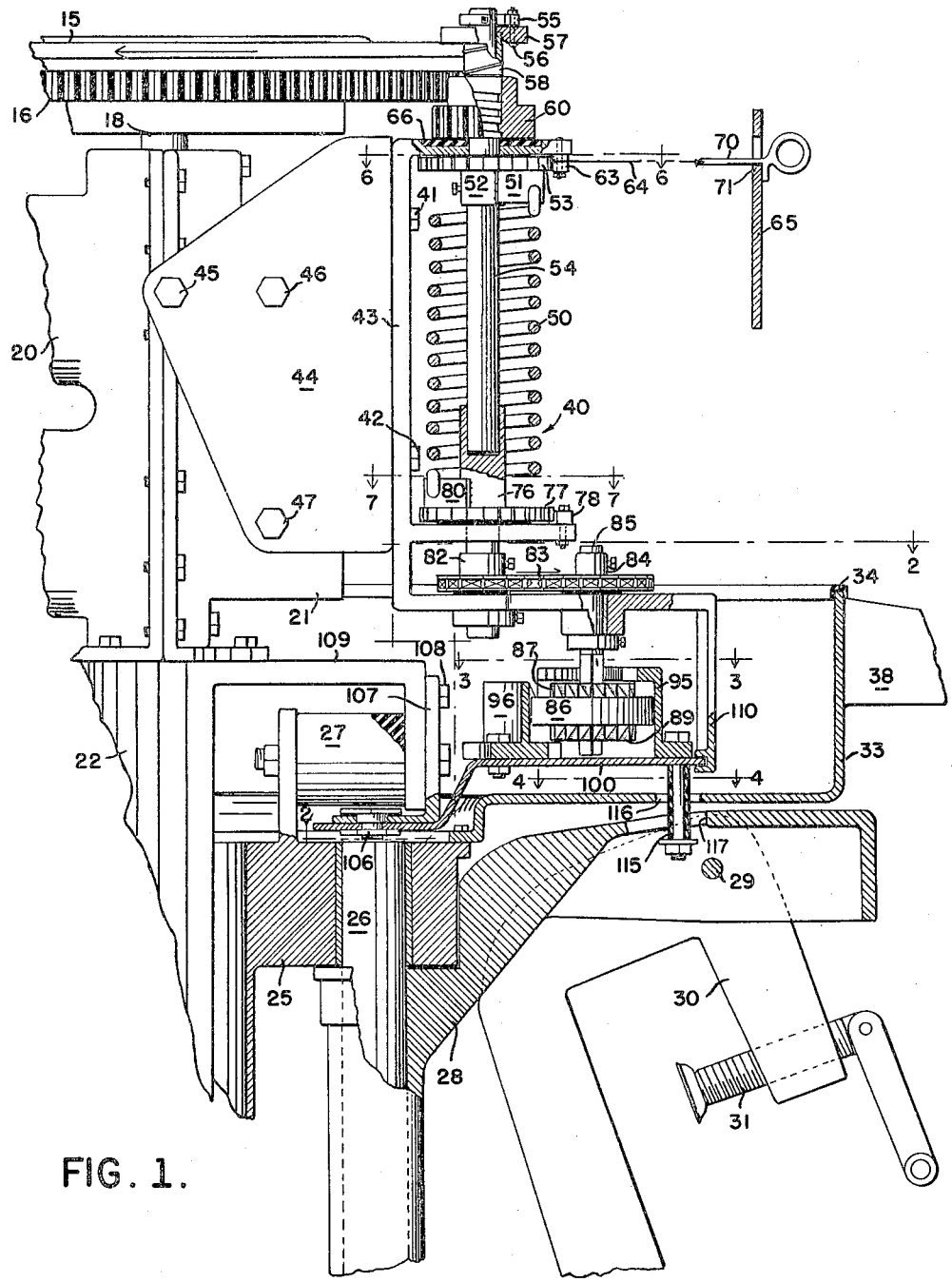
Figure 2:
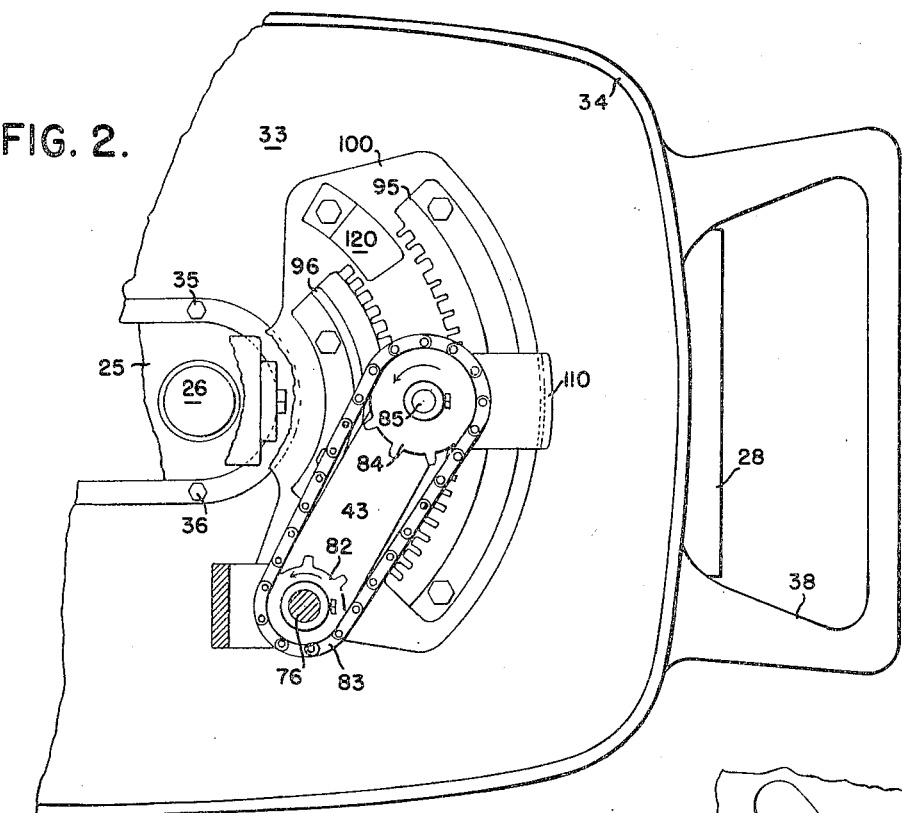
Figure 6:
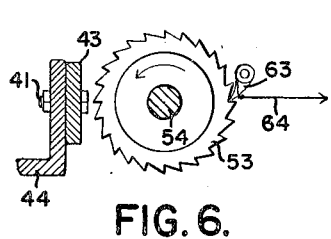
Figure 5:
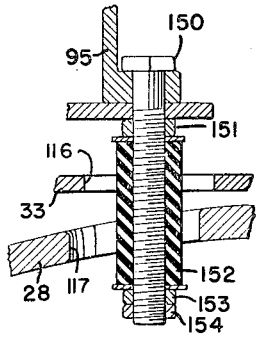
Figure 4:
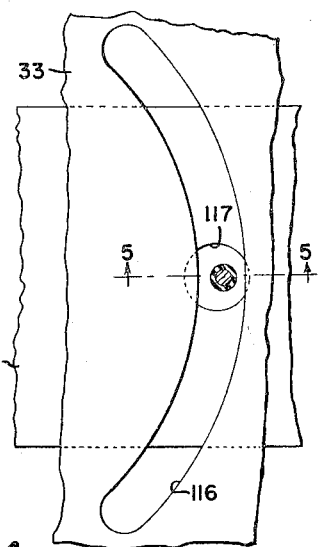
Figure 7:
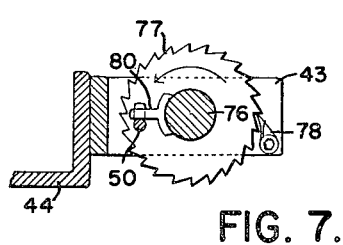
Figure 13:
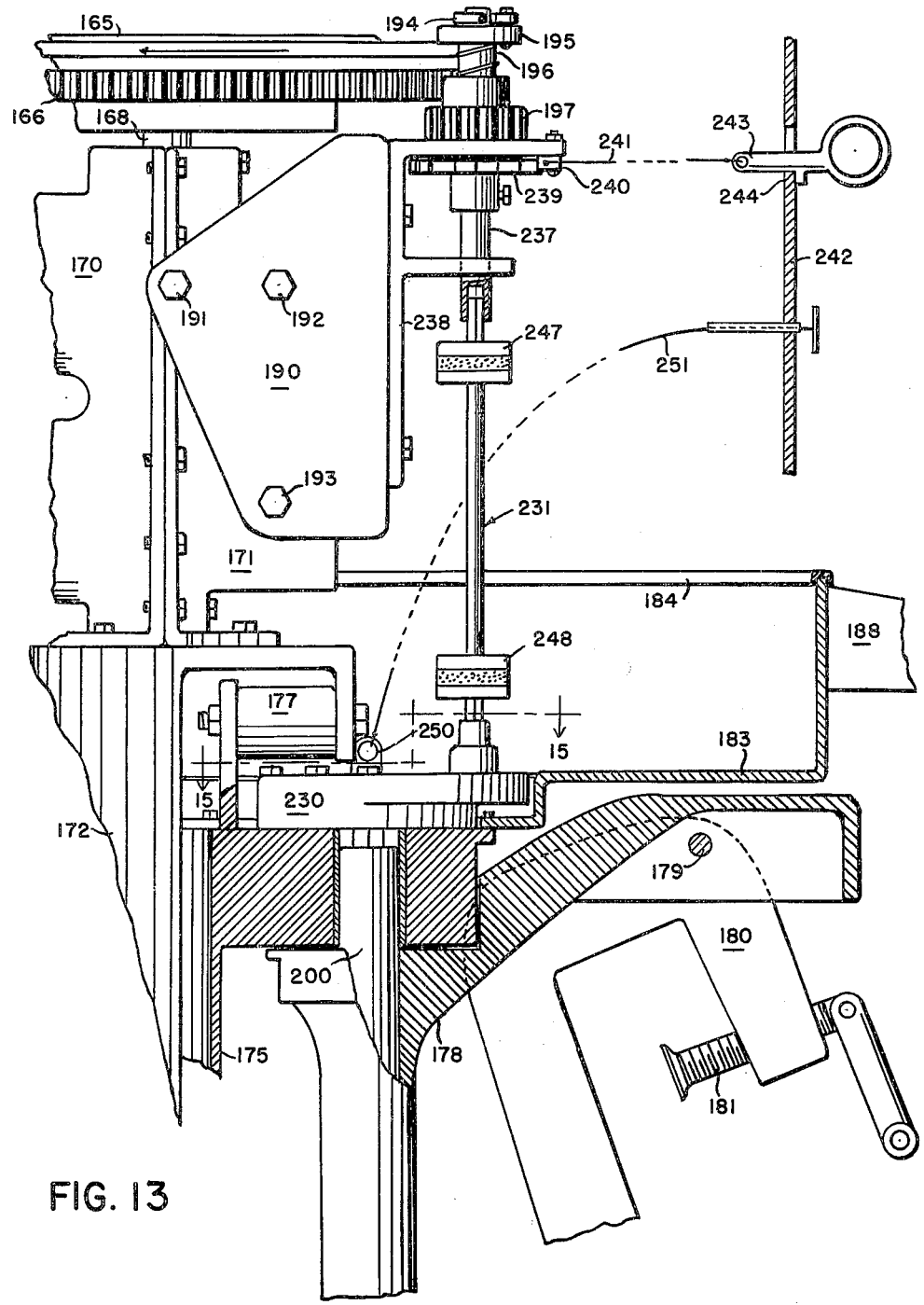
Figure 15:
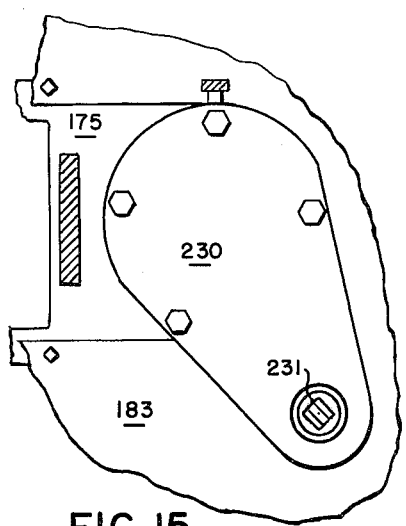
Figure 16:
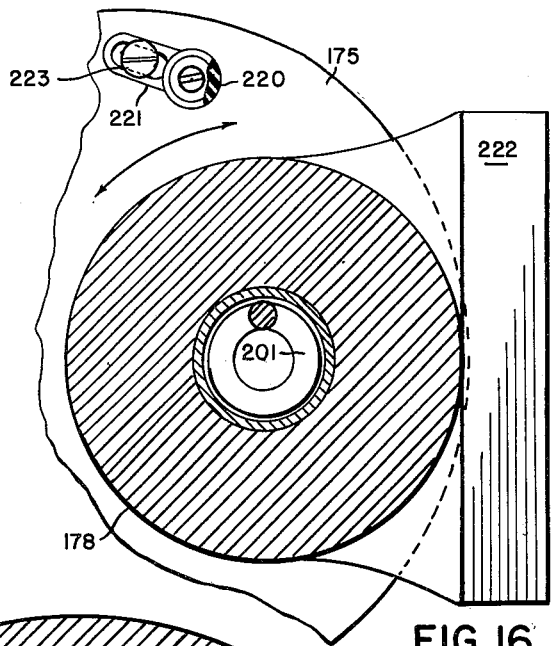
Figure 17:
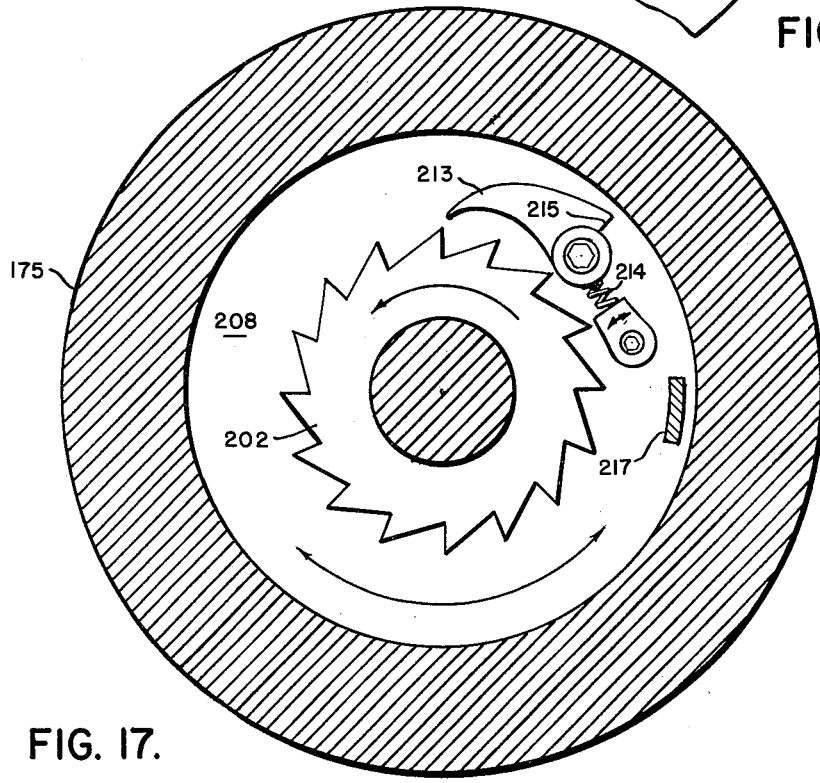
Figure 18:
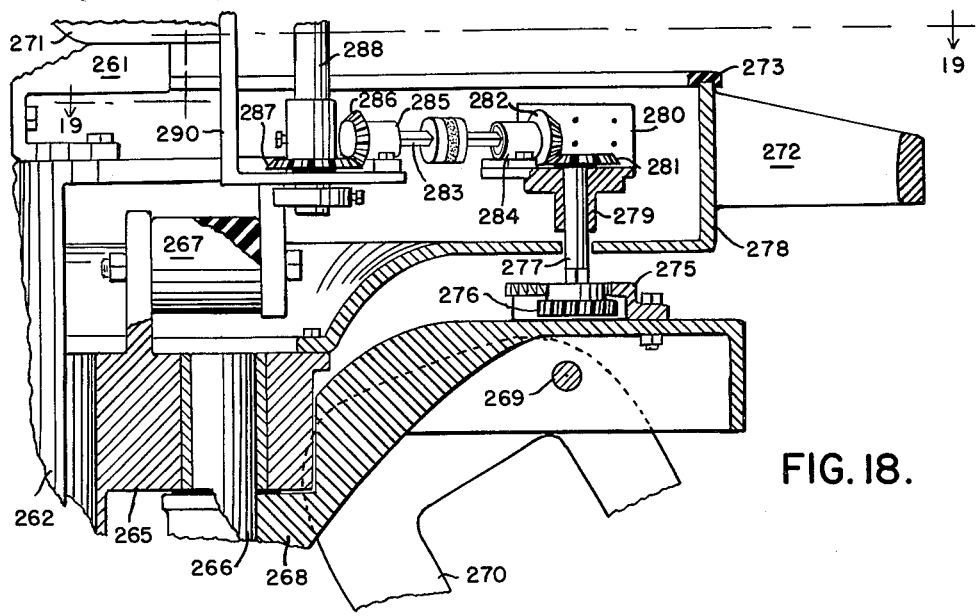
Figure 19:
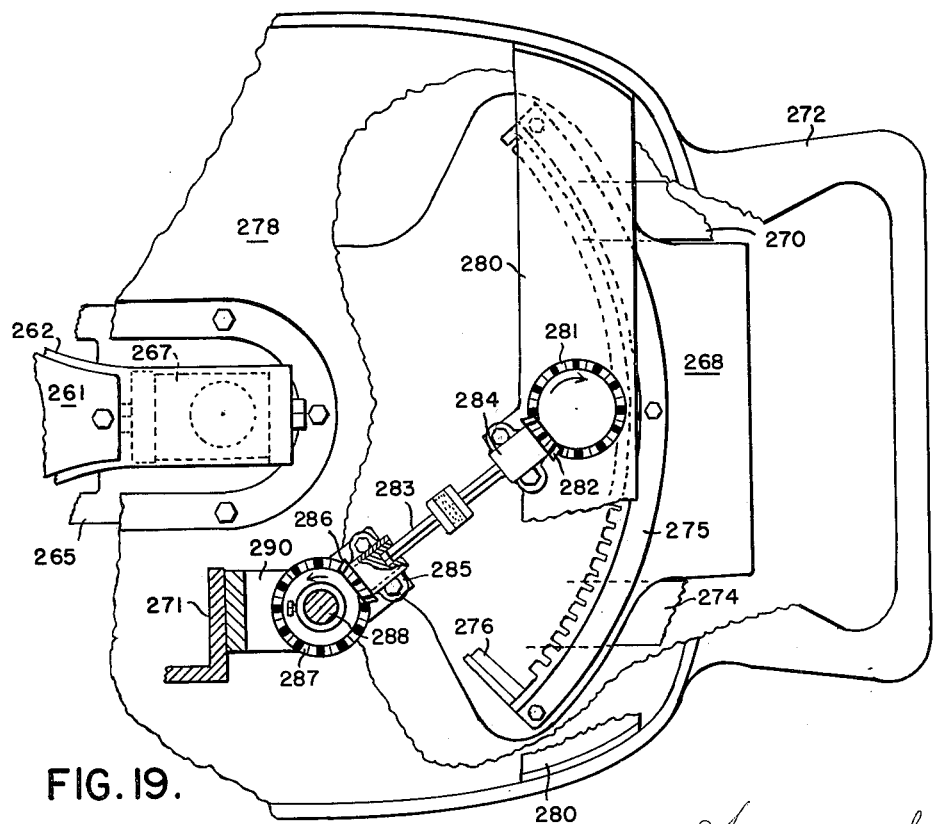
Figure 20:
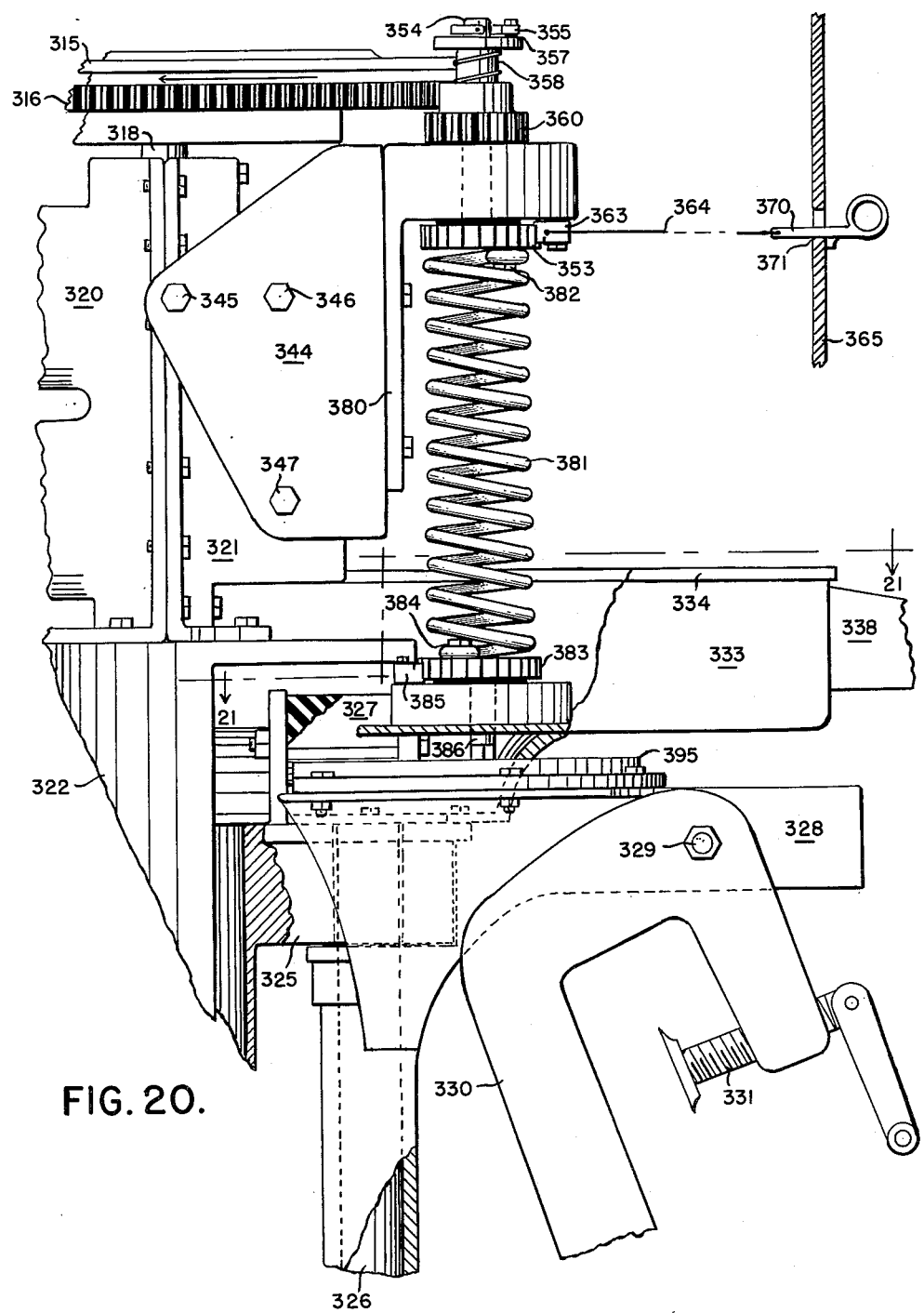
Figure 21:
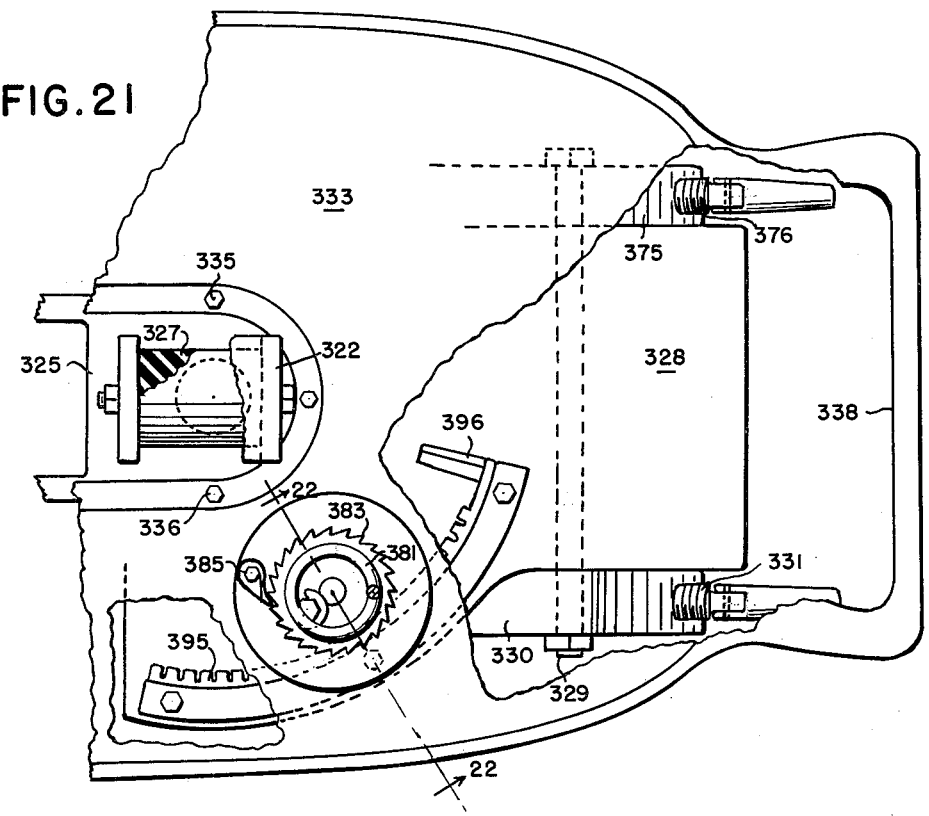
Figure 22:
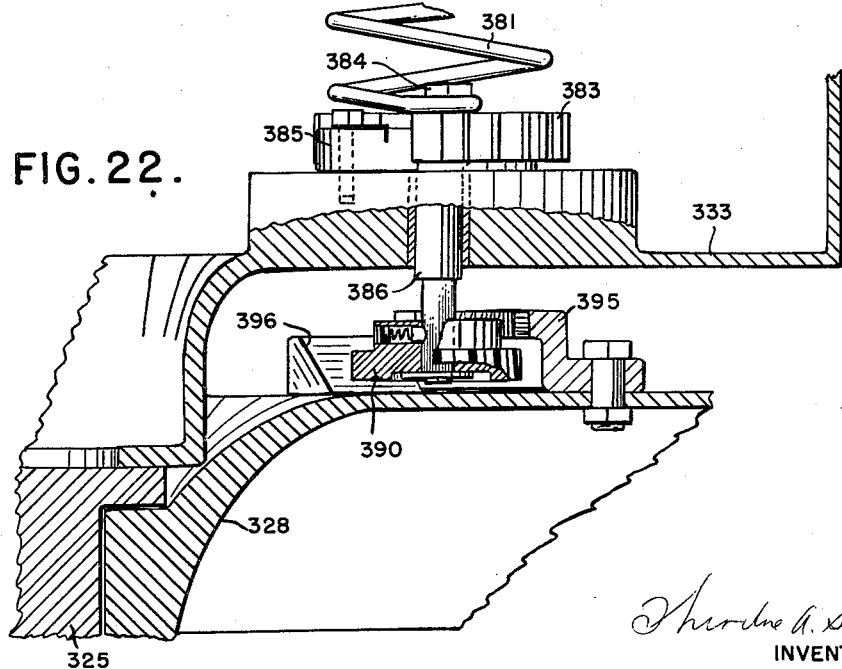

For a description of the invention in detail reference is made to the accompanying drawing in which:

FIG. 1 is a side elevation of an outboard motor, with parts removed and with parts broken away or shown in section, illustrating essential elements of the motor with the starter attached thereto;

FIG. 2 is a view along line 2—2 of FIG. 1;
FIG. 3 is a view along line 3—3 of FIG. 1;
FIG. 4 shows a detail along line 4—4 of FIG. 1;
FIG. 5 is an enlarged section on line 5—5 of FIG. 4, but varied from the showing of FIG. 1;
FIG. 6 is a section on line 6—6 of FIG. 1;
FIG. 7 is a section on line 7—7 of FIG. 1;
FIG. 8 is an enlarged section on line 8—8 of FIG. 3;
FIG. 9 is an enlarged section on line 9—9 of FIG. 3, except with parts in a different operational setting;
FIG. 10 is an enlarged section on line 10—10 of FIG. 3, except with parts in a different operational setting;
FIG. 11 illustrates a different embodiment, corresponding in section view to the section of FIG. 10;
FIG. 12 is a plan view of the embodiment of FIG. 11;
FIG. 13 is a view similar to that of FIG. 1 but showing another embodiment;
FIG. 14 is an enlarged view, mostly in a longitudinal section, of the embodiment of FIG. 13 showing the lower portion of FIG. 13 and additional lower structure;
FIG. 15 is a view on line 15—15 of FIG. 13;
FIG. 16 is a section on line 16—16 of FIG. 14;
FIG. 17 is an enlarged section on line 17—17 of FIG. 14;
FIG. 18 illustrates a different embodiment, corresponding in view to the central portion of FIG. 1, it being contemplated that the balance of the structure shown in FIG. 1 corresponds to that of the embodiment of FIG. 18;
FIG. 19 is a view on line 19—19 of FIG. 18;
FIG. 20 is a view similar to that of FIG. 1, but showing another embodiment;
FIG. 21 is a view on line 21—21 of FIG. 20; and
FIG. 22 is an enlarged section on line 22—22 of FIG. 21, with certain forward parts restored to plan view for purposes of illustration.

Referring to the embodiment of FIGS. 1 through 10, the motor illustrated is of a usual design and is provided with a flywheel 15, having fixed thereon a starter ring gear 16, the flywheel being keyed to the crankshaft 18. Cylinder block 20 and crankcase 21 are bolted together and the propeller leg 22 is bolted onto the cylinder block and crankcase, the propeller leg carrying on its lower end the usual propeller (not shown).

The internal combustion engine assembly, including the above mentioned parts and other non-illustrated parts fixed thereon, is resiliently supported on a transom mounting apparatus including a swiveling steering bracket 25 which is mounted for free lateral pivoting movement on king pin 26. One of the resilient mounts for supporting the engine assembly is illustrated at 27, shown as a rubber block but conventional spring mounts are also contemplated.

The king pin is fixed in tilt bracket 28, which is mounted by transverse pin 29 onto a transom mounting member such as clamp 30 to allow tilting of the engine assembly, the clamp 30 being fixed to the boat transom by the clamping operation of clamp screws, one of which is illustrated at 31. The structure thus provides means attaching the engine assembly to the transom mounting apparatus with a resilient mounting of the engine assembly regardless of the fact that the transom mounting member is rigidly attached to the boat.

Pan member 33, having a rubber sealing ring 34 on which the removable hood (not illustrated) rests, is fixed to the swiveling steering bracket 25 by bolts, as illustrated for example at 35 and 36. Handle 38, to which the conventional cables leading from the steering wheel when the boat is remote control equipped are attached, is integral with pan member 33. Also the usual steering and control handle (not illustrated) for use when the boat is not remote control equipped is attached to the pan member.

The parts above described are of a conventional structure. With the motor mounted on the boat transom and in the untilted position, the boat is steered by swinging the handle 38 to right or left thus to pivot the steering bracket 25 and the carried engine assembly on the king pin 26 with a lateral pivoting movement.

The spring motor 40 of the starter is fixedly attached to the engine by means of bolts, as at 41 and 42, mounting the frame 43 on bracket 44, bracket 44 being secured to the engine crankcase 21 by stud bolts 45, 46, and 47. The bracket 44 and its mounting is similar to the bracket conventionally used to mount the electric starter motor on a 1960 Model Johnson Outboard Motor.

The spring motor is provided with a helical wind-up motor spring 50 biased to drive against lug 51 fixed to hub 52 of a ratchet 53, the ratchet and hub being non-rotatably mounted on starter shaft 54. This starter shaft extends upwardly through a suitable journal aperture in frame 43 and carries on its upwardly projected end a cushioning spring 55, the free end of the spring being attached by pin 56 to stop-nut 57 screwed onto the top of member 58 thus to mount member 58 on the starter shaft with a slight rotating movement against the resilient force of the cushioning spring. Member 58 is provided with a helical screw thread on which the starter pinion 60 is mounted.

Spring pressed pawl 63 engages ratchet 53 to lock it against rotation, but is released by a manual pull on flexible pullwire 64 of a conventional flexible cable, one end of the pullwire being attached to the pawl and the other end leading to a convenient location, such as schematically illustrated dashboard 65 of a boat equipped with a steering wheel, or the panel of the outboard motor.

Assume the spring motor is wound up and it is desired to start the engine. Releasing the ratchet 63 releases the stored energy of the spring and its power is imparted to starter shaft 54 rotating it counterclockwise as viewed downward. Rotation of the shaft imparts, through cushioning spring 55 and stop-nut 57, a corresponding rotation to member 58. Due to its inertia, the starter pinion 60 in its neutral position is temporarily restrained against rotation and is therefore propelled upwardly on its spiral mounting into abutment with stop-nut 57 bringing the starter pinion into mesh with the ring gear 16 thus to rotate the fly-wheel 15 for cranking the engine. When the engine starts, pinion 60 is automatically thrown downwardly to its neutral position against a resilient cushion 66.

In FIG. 1, latch 70 attached to the pull end of wire 64 is shown as hooked over a ledge 71 on the dashboard to hold the pawl 63 out of engagement with the ratchet, the latch being released to permit the pawl to engage the ratchet and lock it against movement. The purpose of this structure will be later explained.

Spring motor 40 is wound by a mechanical movement means for transferring steering movement of the engine assembly to the spring motor. Movement of the steering handle in either a clockwise or counterclockwise direction, thus to impart a corresponding lateral pivoting movement to the engine assembly accomplishes the spring motor winding. To this end, spring winding stem 76 is suitably journaled in an aperture in frame 43 and carries a ratchet 77 engaged by spring pressed pawl 78 permitting rotation of the ratchet in a direction for winding the motor spring 50 but preventing rotation in the opposite direction.

Lug 80 fixed to the hub of the ratchet engages the wind-up end of the spring.

Stem 76 is turned through medium of a chain sprocket 82 secured to the stem, chain 83 driven by sprocket 84 secured to shaft 85 journaled in frame 43, and drive pinion member 86 non-rotatably but slidably mounted on the lower squared end of shaft 85.

Pinion member 86 is provided with an upper toothed pinion 87, an intermediate portion 88 and lower toothed pinion 89. Due to the mounting of the pinion member on the engine assembly, a lateral pivoting movement of the engine assembly for steering the boat, which movement carries along the frame 43 and all parts fixed to it, also imparts bodily to pinion member 86 a lateral pivoting movement about the pivotal axis of the engine assembly, or of king pin 26.

A circular toothed rack 95 with its teeth adapted to mesh with the teeth of pinion 87, and a circular toothed rack 96 with its teeth adapted to mesh with the teeth of pinion 89, the center of curvature of the circular racks being substantially coincident with the pivotal axis of the engine assembly, are each stationarily mounted relative to the lateral pivoting movement of the engine assembly, and held in proper alignment so that pinion member 86 may be shifted either upwardly or downwardly to bring the teeth of either of its pinions 87 or 89 into mesh with the teeth of its respective rack. The racks are fixed to a plate 100 as by bolts 101 and 102 for rack 95 and bolts 103 and 104 for rack 96. Plate 100 is secured at one side by a swivel bolt 106, permitting swivelling movement of the engine assembly relative to the plate on the swivel axis of the engine assembly. The swivel bolt is secured to a bracket 107 attached as by bolt 108 to arm 109 integral with propeller leg 22. At its other side, plate 100 is held in proper position by a lug 110 which is integral with frame 43 and is provided with a groove, as illustrated in FIG. 1, in which the side edge of the plate is held with a sliding fit.

A projection 115, rubber covered for antinoise purposes, is secured to plate 100 and extends downwardly through a circular slot 116 (center of curvature of the slot on the axis of king pin 26) and engages tilt bracket 28 with a lost motion connection, as for example by being extended into an aperture 117 in bracket 28 somewhat larger than the projection. The purpose of the lost motion connection is to allow play to permit movement of the engine assembly, including the plate 100, incident to the resilient mounting.

Either pinion 87 or pinion 89 is automatically shifted from a neutral state into operative engagement with its respective rack by a proper steering movement of the engine assembly. Observing FIGS. 2, 3, and 10, it will be seen that movement of handle 38 counterclockwise about king pin 26 to bring the engine assembly near to the extreme lateral pivotal boat steering position will bring the intermediate portion 88 of pinion member 86 into engagement with a sloping member 120 with an inclined surface mounted stationary by bolt 121 on plate 100. A slight continued pivotal movement of the handle will cause member 86 to be shifted automatically upwardly on the square shaft to bring the teeth of pinion 87 into mesh with the teeth of rack 95. With the pinion teeth in such meshed position, the opposite steering movement of the engine assembly will impart a rotation to the pinion member, counterclockwise as viewed downward, thence a rotation to shaft 85, to sprocket 84, to chain 83, to sprocket 82, and finally to stem 76, thus to wind motor spring 50.

Movement of handle 38 clockwise near to the opposite extreme lateral pivotal boat steering position will bring the intermediate portion 88 of pinion member 86 to a position where it engages against a sloping member 123 with a declined surface mounted stationary by bolt 124 on plate 100, thus automatically shifting the pinion member downwardly to bring the teeth of pinion 89 into mesh with the teeth of rack 96. With the pinion teeth in such meshed position, the opposite steering movement of the engine assembly will again impart a counterclockwise rotation to pinion member 86 thus further to wind motor spring 50.

The steering movement for winding the spring may be repeated as often as necessary to impart the required stored energy into the spring motor. The amount of steering movement required will depend on the capacity of the spring motor and on the speed ratio in the mechanical movement means linking the steering handle and the spring winding stem. This ratio depends on the ratio of pinion 87 to rack 95, or of the pinion 89 to rack 96, and on the ratio of sprocket 84 to sprocket 82, or will depend on the ratio of whatever other type of mechanical movement means that may be used to connect the pinion member to the spring motor. Thus the actual power, or force, required to wind the motor spring may be selected to make the operation easy, even in case a spring motor of high power is required, as, for example, with a high horse power engine.

When the boat is in normal steering operation, the mechanical movement means for transferring the steering movement of the engine assembly to the spring motor is normally in the neutral state. As illustrated in FIG. 8, the teeth of pinion 87 are slightly below the teeth of rack 95 and the teeth of pinion 89 are slightly above the teeth of rack 96. Pinion member 86 is maintained on shaft 85 in such neutral state by means of spring pressed detents 130 and 131 engaging in suitable grooves or pockets in shaft 85. These detents may be selected of such a pressure holding power that they act as yieldable stop means tending to restrain further pivotal movement of the engine assembly, whereby the helmsman can tell by the feel of the wheel the position when the shift of pinion member 86 from neutral into one or the other of its operative positions for winding the spring motor is about to be made. Thus the helmsman can at will select either the movement necessary to shift the mechanism into a spring winding state or the movement required merely for steering the boat. As shown, the spring pressure on the detents is adjustable by setting of the screw seats of the springs.

There may be occasions, however, during maneuvering of the boat that the steering handle is thrown to an extreme turning position and the teeth of pinion 87 or pinion 89 are unintentionally brought into engagement with rack teeth. Opposite steering movement would then wind the spring motor. If no provision were made to disengage the pinion teeth from the rack teeth, steering, at an intermediate position of the steering handle, would be locked against the reverse movement, due to the fact that member 86 can be rotated in only one direction.

To prevent the steering mechanism from being thus locked, the teeth of pinions 87 and 89 and of racks 95 and 96, on their sides which engage upon a pivotal movement of the engine assembly in a direction opposite to the spring winding direction, are so shaped that the pinion member teeth are automatically forced into the neutral position, thus automatically shifting the mechanical movement means into the neutral state. Note, for example, the sloped shape of rack tooth 135, FIG. 10.

As will be observed in FIGS. 9 and 10, the first few teeth of the racks, as for example tooth 136 of FIG. 10, are not sloped, but are shaped to allow ample room between them for the teeth of the pinions 87 or 89 to slide into place without interference.

Even with the arrangement thus far described, it would be possible, with a long period of running and a large number of unintentional short windings of the spring motor, to wind the spring motor completely and thus lock the steering mechanism in the spring wind-up direction of its movement. Unintentional complete winding of the spring motor is, however, easily prevented with the structure illustrated, by the expedient of hooking latch 70 over ledge 71 during running to hold the pawl 63 out of engagement with ratchet 53, thus providing means for permitting the spring motor to unwind as fast as it is wound.

The structure may be simplified and parts made smaller if only one rack and pinion are used. Such a variation is illustrated in FIGS. 11 and 12 in which the pinion member 140 is provided with one set of teeth 141. The pinion member is slidably and non-rotatably carried on the lower end of a shaft 142 which corresponds to shaft 85 of the previously described embodiment. The pinion member is carried in its neutral position resting on washer 143 bolted onto the lower end of shaft 142. The pinion member engages sloping member 144 having an inclined surface, formed integral with rack 145, to force the pinion member upward to bring its teeth into mesh with the teeth of the rack when the engine assembly is moved to the extreme steering position (counterclockwise as viewed from the top). The pinion member is limited in its upward movement by engagement with the shoulder on shaft 142 formed at the juncture of the round with the square portion of the shaft.

In this embodiment the rack teeth, such as shown by tooth 146, are inclined on one side similar to previously described tooth 135 so that pivotal movement of the engine assembly opposite to the spring winding direction will shift the teeth of pinion member 140 into neutral position. Thus, to wind the spring motor, the helmsman merely swings the steering handle to one side to the extreme position thus to shift the teeth of pinion member 140 into mesh with the teeth of rack 145, then swings the steering handle in the opposite direction any convenient amount, partially to wind the spring, reverses the swing to shift the pinion teeth into neutral position, and repeats the cycle as many times as required to wind the spring motor sufficiently to crank the engine.

As may be observed from FIGS. 11 and 12, the teeth 141 of pinion 140 are shown narrow and widely spaced apart, thus to provide for their free movement into mesh with the teeth of the rack. Also the pinion teeth are shown slightly inclined in a direction tending to move the pinion upwardly while it is rolling in the rack during winding of the spring motor, thus to aid in holding the pinion in its proper upward position. The mating sides of the teeth of the rack are correspondingly inclined.

As a further means of holding the pinion in its upward position, and to aid the helmsman in having the before described feel of the wheel, the spring pressed detents similar to detents 130 and 131 in FIG. 8 may be provided (see illustration in FIG. 22).

FIG. 5 illustrates a slight variation of lug 115 over that shown in FIG. 1. In the embodiment of FIG. 5, the bolt 150 is provided with long threads so that nut 151 can be used to lock the bolt solidly in position. The rubber cover 152 is held between two washers by nut 153 and lock nut 154.

Referring to the embodiment shown in FIGS. 13–17, the flywheel 165, starter ring gear 166, crankshaft 168, cylinder block 170, crankcase 171, propeller leg 172, swiveling steering bracket 175, tilt bracket 178, pin 179, transom clamp 180, clamp screw 181, pan member 183, sealing ring 184, handle 188, bracket 190, stud bolts 191, 192, and 193, cushioning spring 194, stop-nut 195, member 196, and starter pinion 197, correspond in function and essentially in structure (some variations in dimensions) to the previously illustrated and described parts of the same name. A conventional resilient mount 198 for supporting the engine assembly at the lower end of the propeller leg 172 on the lower arm of swiveling bracket 175 is also illustrated in FIG. 14.

In the presently described embodiment, king pin 200 is tubular and the motor spring 201 is housed within the king pin. The king pin is stationarily mounted in tilt bracket 178 and the upper and lower arms of bracket 175 are swiveled respectively on the upper and lower end of the king pin.

Winding of the motor spring by a steering movement of the engine assembly is accomplished through the mechanism movement means illustrated at the bottom of FIG. 14. A ratchet member 202 has an upwardly extending hub suitably journaled in a bearing 203 press fitted into the lower end of the king pin. The ratchet is illustrated as a pair, but in effect is one since the two parts are integral and their teeth are inclined in the same direction. The ratchet member is housed in a cavity provided in the lower arm of bracket 175 and is held in place by closure plate 208 bolted onto the bottom of bracket 175, preferably with a seal to hold grease and prevent entrance of water. Lug 209 integrated with the ratchet member, as by being welded thereto, engages the wind-up end of the motor spring upon turning of the ratchet member counterclockwise as viewed downward. A spring pressed pawl 210 mounted on an outwardly extending flange integral with the king pin engages the ratchet to permit its rotation in a spring winding direction but to prevent the opposite rotation.

Pawl 213 is mounted on plate 208 so that the lateral pivotal movement of the engine assembly for steering the boat is translated to the pawl. During normal steering operation pawl 213 is held in a neutral position relative to ratchet member 202 by pressure spring 214 which, as shown in FIG. 17, is past a dead center position in the direction tending to throw the pawl out of engagement with the ratchet teeth. Movement of the engine assembly to near one of its extreme lateral pivoting positions, thus swiveling plate 208 and the carried pawl 213 clockwise as viewed in FIG. 17, brings projection 215 on pawl 213 into engagement with a stop 217 mounted stationary on the outwardly extending flange of the king pin. A slight further steering movement of the engine assembly automatically shifts the pawl into its operative state in which the pawl engages the teeth of the ratchet. The spring 214 now acts to hold the pawl in its tooth engaging position by virtue of the spring being past the dead center position in the direction tending to throw the pawl into engagement with the ratchet teeth. The opposite swiveling movement of the engine assembly then imparts rotation of ratchet member 202 in the proper direction for winding the motor spring.

Pawl 213 is automatically shifted to a neutral state upon pivotal movement of the engine assembly in the direction opposite to the spring winding direction. Viewing FIG. 17, assume the pawl to be in a ratchet tooth engaging position. Since ratchet member 202 is locked against clockwise rotation, a clockwise rotation of the plate 208 carrying the pawl with it will cause the free end of the pawl to ride up the inclined surface of a ratchet tooth, throwing spring 214 past its dead center position to shift the pawl out of engagement with the ratchet teeth.

Turning to FIG. 16, a yieldable stop, shown as an upstanding rubber buffer 220 attached to a mounting bracket 221, is adjustably secured onto the lower arm of bracket 175. The stop is located such that when the engine assembly is pivotally moved near to its extreme lateral boat turning position, that is to the position at which pawl projection 215 is about to engage stop 217, a projection 222 integral with bracket 173 engages the yieldable stop thus tending to restrain further pivotal movement of the engine assembly. The helmsman is thusly advised by feel when the shift of pawl 213 from its neutral to its spring winding state is about to be made.

The projection 222 is a conventional element of present outboard motors, being the thrust member which engages against the lower end (not shown) of the transom clamp during running of the boat.

Mounting bracket 221 is provided with a slot in which mounting stud screw 223 is engaged for clamping the bracket in place. The structure provides for adjustment of the yieldable stop towards or away from projection 222, thus to adjust the degree of feel available to the helmsman for selecting either a normal steering movement of the engine assembly or the movement required for winding the motor spring.

The use of a yieldable stop of the type above described is contemplated with any of the other embodiments disclosed in this application.

Power from the stored energy of the motor spring 201 is imparted a starter pinion 197 through a speed increasing transmission 230 mounted on bracket 175 and through a flexible shaft 231. The motor spring drives against a lug integrated with shaft 233 suitably journaled in a bearing 234 press fitted into the upper end of the king pin. The squared upper end of shaft 233 makes non-rotatable connection with its mate in the transmission.

Starter shaft 237 is journaled in bearing apertures formed in frame 238, the frame being bolted onto bracket 190. Thus the starter pinion 197 is carried by the engine in a position for proper alignment with the ring gear 166. Ratchet 239 is non-rotatably attached on the starter shaft and spring pressed pawl 240, when in engagement with the ratchet, prevents its rotation. The pawl and ratchet, flexible pull wire 241, dashboard or panel 242, latch 243 and ledge 244 correspond to the previously shown and described parts of the same name.

The shaft 231 is illustrated as made flexible by insertion of two flexible (universal) joints 247 and 248 and a sliding fit of the upper squared end of the shaft with the lower end of starter shaft 237. Any other type of flexible shaft, such as a unitary shaft in which the material of the shaft is itself flexible, may be substituted. The flexibility of shaft 231 allows sufficient play to permit movement of the engine assembly and starter pinion incident to the resilient mounting of the engine assembly.

As illustrated in FIG. 13, transmission 230 is provided with a clutch lever 250 and with a flexible thrust (pull or push) wire 251 of a conventional type flexible cable leading from the clutch lever to the dashboard 242, thus to provide a convenient means for the helmsman to disengage the transmission gears. The use of such a clutch type transmission in lieu of a fixed gear chain is, however, optional. Also it is contemplated that, for simplicity reasons, a simple spring pressed pawl may be used in lieu of pawl 213, such that the pawl always engages the ratchet 202 to wind the motor spring. With such arrangement the helmsman would, during normal running of the boat, keep pawl 240 disengaged from ratchet 239, or keep the transmission out of gear, thus permitting the motor spring to unwind continuously as it is wound, but would engage pawl 240 with ratchet 239, or engage the transmission gears, for a motor spring wind up pivotal movement of the engine assembly.

The embodiment of FIGS. 13-17 is advantageous over the embodiment first described in that it utilizes the waste space within the king pin to house the motor spring. Also the spring windup mechanism is simple and located out of the way. However, a spring of higher strength is required to avoid the requirement of a large number of spring windup movements of the engine assembly. To illustrate, assume a maximum pivotal steering movement of 90° for the engine assembly. At least four full swings of the steering handle would be required to wind the spring one turn. If the spring is selected of a strength such that one turn is sufficient to spin the flywheel of the engine one revolution, and one revolution of the flywheel is sought, then the transmission should be selected to increase the turns of the starter pinion in the inverse ratio of the pinion to the starter gear revolution speed.

An increase of spring power for a given spring strand diameter can be obtained by selecting a spring of such a coil diameter that it engages the wall of the king pin before the spring is completely unwound.

Also use of a mechanical movement means with ratchet member 202 which increases the spring wind up speed is contemplated in which event a spring of lower power but greater winding capacity would be used and a simplier mechanical movement means could be substituted for transmission 230.

Referring to the embodiment shown in FIGS. 18 and 19, the unillustrated portion of the structure above the portion shown in FIG. 18 is the same as the structure shown at the upper portion of FIG. 1.

In the presently described embodiment, crankcase 261, propeller leg 262, swiveling steering bracket 265, king pin 266, resilient mount 267, tilt bracket 268, pin 269, transom clamp 270, bracket 271, handle 272, and sealing ring 273 correspond to the previously described parts of the same names and illustrated in FIG. 1. FIG. 19 also ilustrates fragmentarily a transom clamp 274 which is similar to clamp 270 and is mounted on pin 269 at the side of tilt bracket 268 opposite clamp 270, the two transom clamps acting as a pair.

A circular toothed rack 275 is bolted stationary on tilt bracket 268 with the center of curvature of the rack coincident with the pivotal axis of the engine assembly. The rack is similar to that previously described in reference to FIGS. 11 and 12, except that it is reversed, the inclined surfaced member being at the opposite end of the rack. Drive pinion member 276 is also similar to previously described pinion member 140 except that its teeth are inclined oppositely.

Shaft 277 extends upwardly through an aperture in pan member 278 and is journaled in a bearing 279 integrated with a supporting bracket 280 secured, as by welding, to the pan member. A bevel gear 281 integrated with the upper end of the shaft drives a bevel gear 282 thence driving a flexible shaft 283 supported at one end in bearing 284 and at the other end in bearing 285, thence driving a bevel gear 287 keyed to motor spring winding stem 288.

The lower end of the winding stem is supported in a suitable journal bearing in the frame 290 of the spring motor. Since the spring motor frame 290 is fixedly mounted on bracket 271 carried by the engine assembly, the required play permitting movement of the engine assembly incident to its mounting is provided by flexing of shaft 283.

The bevel gear arrangement reverses the direction of rotation of gear 281 and consequently of pinion member 276 relative to the rotation of gear 287. To obtain the proper counterclockwise rotation (viewed downwardly) of gear 287 for winding the motor spring, the engine assembly must be pivoted counterclockwise in its steering movement while the teeth of the pinion are in mesh with the teeth of rack 275. Hence the rack and pinion member are reversed to the arrangement of these parts illustrated in the embodiment of FIGS. 11 and 12.

Referring to the embodiment illustrated in FIGS.

20–22, a simplification over the other embodiments is obtained by utilizing the flexibility of the motor spring to allow play for permitting movement of the engine assembly incident to its resilient mounting rather than providing for this function by the previously described special constructions of other starter parts.

In the presently described embodiment, flywheel 315, starter ring gear 316, crankshaft 318, cylinder block 320, crankcase 321, propeller leg 322, swiveling steering bracket 325, king pin 326, resilient mount 327, tilt bracket 328, pin 329, transom clamp 330, clamp screw 321, pan member 333, sealing ring 334, bolts 335 and 336, handle 338, bracket 344, stud bolts 345, 346, and 347, ratchet 353, starter shaft 354, cushioning spring 355, stop-nut 357, member 358, starter pinion 360, spring pressed pawl 363, flexible pull wire 364, dashboard or panel 365, latch 370, and ledge 371, are similar to the correspondingly illustrated and named parts of the previously described embodiments.

The swiveling steering bracket 325 and pan member 333 are varied in shape over such parts of the other embodiments in order to provide mounting supports for starter parts. The second transom clamp member 375 and its clamp screw 376 are also shown in FIG. 21.

Spring motor frame 380 is provided with a long bearing in which the starter shaft 354 is journaled to afford an adequate support to keep the shaft in proper position for aligning the starter pinion with the starter ring gear. The upper end of motor spring 381 is secured by stud bolt 382 to ratchet 353 keyed to shaft 354. The lower end of the motor spring is secured to ratchet 383 by stud bolt 384, the ratchet being prevented by spring pressed pawl 385 from turning in a direction opposite to the spring winding direction. Shaft 386 is keyed to ratchet 383 and extends downwardly through a long bearing fixed to pan member 333 to provide adequate support for the shaft. The lower squared end of the shaft carries a pinion member 390 similar to pinion member 140 of FIGS. 11 and 12, and provided with a spring pressed detent similar to previously described detent 130.

A circular rack 395 having an inclined surfaced member 396, similar to that of FIGS. 11 and 12, is bolted onto tilt bracket 328 in proper position for the teeth of pinion member 390 to engage the rack teeth for a spring winding pivotal steering movement of the engine assembly.

Since shaft 386 is the only mechanical movement connection between pinion member and the motor spring, the ratio of the spring wind up speed to that of the steering movement of the engine assembly depends on the ratio of the circular rack to the pinion member. Proportioning the parts as illustrated results in a lower ratio than that shown in FIGS. 1–13, for instance. The rack of FIGS. 20–21 is comparatively short because it is positioned to align drive pinion member 390 with the starter pinion 360.

A greater spring winding speed may be obtained by using a smaller drive pinion. Also any desired ratio can be obtained by positioning the rack further from the pivotal axis of the engine assembly, as positioned in FIG. 18 for example, and by using a speed increasing mechanical movement linkage between shaft 386 and the ratchet 383.

I claim:

1. An outboard motor having a transom mounting apparatus adapted to be fixed to the transom of a boat for mounting the motor thereon, having an internal combustion engine assembly including an internal combustion engine and a propeller leg fixed to the engine, and having means attaching the engine assembly to the transom mounting apparatus permitting a lateral pivoting movement of the engine assembly for steering the boat, a starter comprising a spring motor for cranking the engine, means for winding the spring motor by a steering movement of the engine assembly, and means operable by the helmsman for releasing the stored energy of the spring motor to crank the engine.

2. The outboard motor of claim 1 wherein the spring motor is fixedly attached to the engine assembly and wherein the means for winding the spring motor comprises a circular, toothed rack mounted stationary relative to the lateral pivoting movement of the engine assembly such that the center of curvature of the circular, toothed rack is substantially coincident with the pivotal axis of the engine assembly, a pinion member having pinion teeth mounted to bodily move pivotally with the engine assembly with its teeth normally in a neutral position relative to the rack teeth, means for bringing the pinion teeth into mesh with the rack teeth whereby a steering movement of the engine assembly imparts rotation to the pinion member, and mechanical movement means connecting the pinion member to the spring motor, whereby the rotation of the pinion member winds the spring motor.

3. The outboard motor of claim 2 wherein the means for bringing the pinion teeth into mesh with the rack teeth comprises a sloping member against which the pinion member engages near an extreme pivotal position of the engine assembly such that a continued pivotal movement of the engine assembly automatically shifts the pinion member teeth into mesh with the rack teeth.

4. The outboard motor of claim 3 wherein the sides of the rack teeth and of the pinion teeth which engage when in mesh upon pivotal movement of the engine assembly in a direction opposite to the spring winding direction are so shaped that pivotal movement of the engine assembly in the opposite direction automatically shifts the pinion member teeth into the neutral position.

5. The outboard motor of claim 2 wherein the means attaching the engine assembly to the transom mounting apparatus includes a resilient mounting for the engine assembly, wherein the circular toothed rack is pivotally mounted relative to the engine assembly on a pivotal axis substantially coincident with the pivotal axis of the engine assembly, and wherein a lost motion connection is provided between the circular toothed rack and the transom mounting apparatus to prevent pivotal movement of the rack when the engine assembly is pivotally moved but to permit movement of the engine assembly and rack incident to the resilient mounting.

6. An outboard motor having a transom mounting apparatus adapted to be fixed to the transom of a boat for mounting the motor thereon, having an internal combustion engine assembly including an internal combustion engine and a propeller leg fixed to the engine, and having a tubular king pin attaching the engine assembly to the transom mounting apparatus permitting a lateral pivoting movement of the engine assembly for steering the boat, a starter comprising a spring motor for cranking the engine, the spring of the spring motor being housed within the tubular king pin, means for winding the motor spring by a steering movement of the engine assembly, and means operable by the helmsman for releasing the stored energy of the spring motor to crank the engine.

7. An outboard motor having a transom mounting apparatus adapted to be fixed to the transom of a boat for mounting the motor thereon, having an internal combustion engine assembly including an internal combustion engine provided with a flywheel and a propeller leg fixed to the engine and having a tubular king pin attaching the engine assembly to the transom mounting apparatus permitting a lateral pivoting movement of the engine assembly for steering the boat, a motor spring housed within the tubular king pin, means for winding the motor spring by a steering movement of the engine assembly, a starter ring gear fixed to the flywheel, a starter pinion carried by the engine adapted to engage the ring gear for cranking the engine, mechanical movement means connecting the motor spring to the starter pinion, and means operable by the helmsman for releasing the stored energy of the motor spring to impart rotation to the starter pinion for cranking the engine.

8. The outboard motor of claim 7 wherein the engine assembly is resiliently mounted relative to the king pin and wherein the mechanical movement means connecting the motor spring to the starter pinion includes a flexible shaft to permit movement of the engine assembly incident to the resilient mounting.

9. An outboard motor having an engine assembly including an internal combustion engine and a propeller leg fixed to the engine, having a tilt bracket to which the engine assembly is attached permitting a lateral pivoting movement of the engine assembly for steering a boat, and having a transom mounting member adapted to be fixed to the transom of the boat and on which the tilt bracket is mounted permitting tilting of the engine assembly, a starter comprising a circular, toothed rack mounted stationary on the tilt bracket such that the center of curvature of the circular, toothed rack is coincident with the pivotal axis of the engine assembly, a pinion member mounted bodily to move pivotally with the engine assembly and having pinion teeth normally in a neutral position relative to the rack teeth, means for bringing the pinion teeth into mesh with the rack teeth whereby a steering movement of the engine assembly imparts rotation to the pinion member, a motor spring, mechanical movement means connecting the pinion member to the motor spring whereby rotation of the pinion member winds the spring, and means operable by the helmsman for releasing the stored energy of the motor spring to crank the engine.

10. The outboard motor of claim 9 wherein the engine assembly is resiliently mounted relative to the tilt bracket, wherein the motor spring is carried by the engine assembly, and wherein the mechanical movement means includes a flexible shaft to permit movement of the engine assembly incident to the resilient mounting.

11. An outboard motor having an engine assembly including an internal combustion engine provided with a flywheel and a propeller leg attached to the engine, having a tilt bracket to which the engine assembly is attached permitting a lateral pivoting movement of the engine assembly for steering a boat, and having a transom mounting member adapted to be fixed to the transom of the boat and on which the tilt bracket is mounted permitting tilting of the engine assembly, a starter comprising a starter ring gear fixed to the flywheel, a starter pinion carried by the engine adapted to engage the ring gear, a motor spring connected to the starter pinion such that release of the stored energy of the motor spring rotates the starter pinion for cranking the engine, a circular, toothed rack mounted stationary on the tilt bracket such that the center of curvature of the circular, toothed rack is substantially coincident with the pivotal axis of the engine assembly, a pinion member mounted bodily to move pivotally with the engine assembly and having pinion teeth normally in a neutral position relative to the rack teeth, means for bringing the pinion teeth into mesh with the rack teeth whereby a steering movement of the engine assembly imparts rotation to the pinion member, said pinion member being connected to the motor spring whereby rotation of the pinion member winds the spring, and means operable by the helmsman for releasing the stored energy of the motor spring to crank the engine.

12. The outboard motor of claim 11 wherein the engine assembly is resiliently mounted relative to the tilt bracket, and wherein the flexibility of the motor spring permits movement of the engine assembly incident to the resilient mounting.

13. An outboard motor having a transom mounting apparatus adapted to be fixed to the transom of a boat for mounting the motor thereon, having an internal combustion engine assembly including an internal combustion engine and a propeller leg fixed to the engine, and having means attaching the engine assembly to the transom mounting apparatus permitting a lateral pivoting movement of the engine assembly for steering the boat, a starter comprising a spring motor for cranking the engine, mechanical movement means for transferring steering movement of the engine assembly to the spring motor for winding the motor spring, the mechanical movement means being shiftable such that during normal steering operation the mechanical movement means is in a neutral state and steering movement does not wind the motor spring, means for automatically shifting the mechanical movement means into operative state upon movement of the engine assembly to near its extreme lateral pivotal boat turning position, whereupon movement of the engine assembly in the opposite pivoting direction winds the motor spring, means for automatically shifting the mechanical movement means into neutral state upon pivotal movement of the engine assembly in the direction opposite to the spring winding direction, and means operable by the helmsman for releasing the stored energy of the spring motor to crank the engine.

14. The outboard motor of claim 13 wherein yieldable stop means is provided such that, upon said movement of the engine assembly to near its extreme lateral pivotal boat turning position, the yieldable stop means tends to restrain further pivotal movement, whereby the helmsman can tell by feel when the shift of the mechanical movement means from neutral to the spring winding state is about to be made.

15. An outboard motor having a transom mounting apparatus adapted to be fixed to the transom of a boat for mounting the motor thereon, having an internal combustion engine assembly including an internal combustion engine provided with a flywheel, a starter ring gear fixed to the flywheel, and a propeller leg fixed to the engine, and having means resiliently mounting the engine assembly to the transom mounting apparatus permitting a lateral pivoting movement of the engine assembly for steering the boat, a starter comprising a starter pinion carried by the engine adapted to engage the ring gear, a motor spring connected to the starter pinion such that release of the stored energy of the motor spring rotates the starter pinion for cranking the engine, means for winding the motor spring by a steering movement of the engine assembly, the starter parts being constructed to allow play to permit movement of the engine assembly and starter pinion incident to the resilient mounting, and means operable by the helmsman for releasing the stored enery of the motor spring to crank the engine.

References Cited in the file of this patent

UNITED STATES PATENTS

| | | |
|---|---|---|
| 1,620,998 | Clark | Mar. 15, 1927 |
| 1,632,264 | Avis | June 14, 1927 |
| 2,042,841 | Harmon | June 2, 1936 |
| 2,241,379 | Franci | May 13, 1941 |